United States Patent
Foster

(10) Patent No.: US 10,374,693 B2
(45) Date of Patent: Aug. 6, 2019

(54) COLOR ASSIGNMENT TO LIMIT CONFLICT IN MULTIPLE SPOT BEAM SYSTEMS

(71) Applicant: The Boeing Company, Chicago, IL (US)

(72) Inventor: Christopher J. Foster, Lakewood, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/814,307

(22) Filed: Nov. 15, 2017

(65) Prior Publication Data

US 2019/0149225 A1    May 16, 2019

(51) Int. Cl.
*H04B 7/185* (2006.01)
*H04W 16/28* (2009.01)

(52) U.S. Cl.
CPC ........ *H04B 7/18513* (2013.01); *H04W 16/28* (2013.01)

(58) Field of Classification Search
CPC .............. H04B 7/2041; H04B 7/18513; H04B 7/18519; H04B 7/18515; H04B 17/345; H04B 7/185; H04B 7/1851; H04B 7/18523; H04B 7/18526; H04W 16/02; H04W 16/12; H04W 16/28; H04W 52/243
USPC .............. 455/427, 12.1, 447, 429, 13.3, 453
See application file for complete search history.

(56) References Cited

U.S. PATENT DOCUMENTS

| | | | |
|---|---|---|---|
| 6,021,309 A | * | 2/2000 | Sherman ............ H04B 7/18534 455/12.1 |
| 6,866,231 B2 | | 3/2005 | Higgins |
| 6,993,288 B2 | | 1/2006 | de La Chapelle et al. |
| 7,069,036 B2 | | 6/2006 | Jarett |
| 8,965,385 B2 | | 2/2015 | Feria et al. |
| 9,426,666 B2 | | 8/2016 | Ha et al. |
| 9,487,305 B2 | | 11/2016 | Yang et al. |
| 9,490,893 B2 | | 11/2016 | Veysoglu et al. |

(Continued)

OTHER PUBLICATIONS

Schneider et al., Antennas for multiple spot beam satellites, CEAS Space J (2011) 2:59-66.

*Primary Examiner* — Philip Sobutka
(74) *Attorney, Agent, or Firm* — McDonnell Boehnen Hulbert & Berghoff LLP

(57) ABSTRACT

A method of coordinating reuse of spectrum in a communication system in which a communication node is configured to communicate with devices that are located in multiple regions is described. The method includes obtaining a maximum interference constraint, and determining respective conflicts lists for one or more individual regions of the multiple regions. The conflicts list for each individual region includes at least one other region of the multiple regions for which a pairwise interaction with the individual region violates the maximum interference constraint. Further, the method includes assigning spot beam colors to the multiple regions using the determined conflicts lists such that pairs of regions that violate the maximum interference constraint with respect to one another are assigned different spot beam colors. Still further, the method includes causing the communication node to configure multiple spot beams in accordance with the assigned spot beam colors.

17 Claims, 16 Drawing Sheets

(56) References Cited

U.S. PATENT DOCUMENTS

| | | |
|---|---|---|
| 2014/0194129 A1 | 7/2014 | Feria et al. |
| 2016/0329956 A1 | 11/2016 | Ha et al. |
| 2017/0233112 A1 | 8/2017 | McVicker et al. |
| 2017/0288769 A1* | 10/2017 | Miller .................... H04B 7/212 |
| 2017/0294996 A1* | 10/2017 | Lee .................... H04B 7/18582 |

* cited by examiner

COLOR ASSIGNMENT TO LIMIT CONFLICT IN MULTIPLE SPOT BEAM SYSTEMS

FIELD

The present disclosure relates generally to communication systems, and more particularly, to methods and systems for coordinating spectrum reuse in communication systems in which a communication node is configured to form multiple spot beams.

BACKGROUND

Modern satellites and other cellular communication systems sometimes achieve a high degree of frequency reuse by employing a number of spot beams rather than a large area single beam. The spot beams provide a beam laydown that forms coverage over a geographic area, and each beam is assigned to operate on a particular orthogonal channel. With this arrangement, two or more beams may reuse the same orthogonal channel through spatial isolation.

Providing spot beam coverage therefore involves assigning orthogonal channels to respective spot beams that provide coverage throughout the geographic area. For instance, these spot beams may be configured in a manner that maintains a desired isolation (e.g., carrier-to-interference ratio) value and minimizes interference among beams. In one parlance, each spot beam may be assigned a spot beam color corresponding to an orthogonal channel. Identical orthogonal channels, then, may be reused by different spot beams with the same spot beam color. By way of example, communication systems may use three, four, or seven different spot beam colors.

For systems with arbitrary geospatial user locations and limited spectral resources, the optimization of coloring to minimize interference among spot beams is fundamentally a solution space that is factorial in size. An exhaustive search for a solution to maximize the minimum carrier-to-interference ratio can be shown to take exponential time on the order of $N_c^{N_b}$, where $N_c$ is the number of colors and $N_b$ is the number of beams. For example, in a 4-color reuse system with 100 beams, there are approximately $1.6 \times 10^{60}$ solutions. Existing approaches for assigning spot beam colors for systems with arbitrary geospatial user locations and limited spectral resources suffer from excessive runtimes and memory usage. Improvements are therefore desired.

SUMMARY

In one example, a method of coordinating reuse of spectrum in a communication system in which a communication node is configured to form multiple spot beams and communicate with devices that are located in multiple regions is described. The method includes obtaining a maximum interference constraint. The method also includes determining, by at least one processor, respective conflicts lists for one or more individual regions of the multiple regions. The conflicts list for each individual region of the one or more individual regions includes at least one other region of the multiple regions for which a pairwise interaction with the individual region violates the maximum interference constraint. Further, the method includes assigning, by the at least one processor, spot beam colors to the multiple regions using the determined conflicts lists such that pairs of regions that violate the maximum interference constraint with respect to one another are assigned different spot beam colors. Still further, the method includes causing the communication node to configure the multiple spot beams in accordance with the assigned spot beam colors.

In another example, a system is described. The system includes a communication node that is configured to form multiple spot beams and communicate with devices that are located in multiple regions. The system also includes a controller that includes at least one processor and is arranged to perform various functions. The functions include obtaining a maximum interference constraint, and determining respective conflicts lists for one or more individual regions of the multiple regions. The conflicts list for each individual region of the one or more individual regions includes at least one other region of the multiple regions for which a pairwise interaction with the individual region violates the maximum interference constraint. The functions also include assigning spot beam colors to the multiple regions using the determined conflicts lists such that pairs of regions that violate the maximum interference constraint with respect to one another are assigned different spot beam colors. Further, the functions include causing the communication node to configure the multiple spot beams in accordance with the assigned spot beam colors.

In another example, a non-transitory computer-readable medium having stored therein instructions that, when executed by at least one processor, cause the at least one processor to perform functions, is described. The functions include obtaining a maximum interference constraint for a communication system, with the communication system including a communication node that is configured to form multiple spot beams and communicate with devices that are located in multiple regions. The functions also include determining respective conflicts lists for one or more individual regions of the multiple regions. The conflicts list for each individual region of the one or more individual regions includes at least one other region of the multiple regions for which a pairwise interaction with the individual region violates the maximum interference constraint. Further, the functions include assigning spot beam colors to the multiple regions using the determined conflicts lists such that pairs of regions that violate the maximum interference constraint with respect to one another are assigned different spot beam colors. Still further, the functions include causing the communication node to configure the multiple spot beams in accordance with the assigned spot beam colors.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

DETAILED DESCRIPTION

Figure 1:
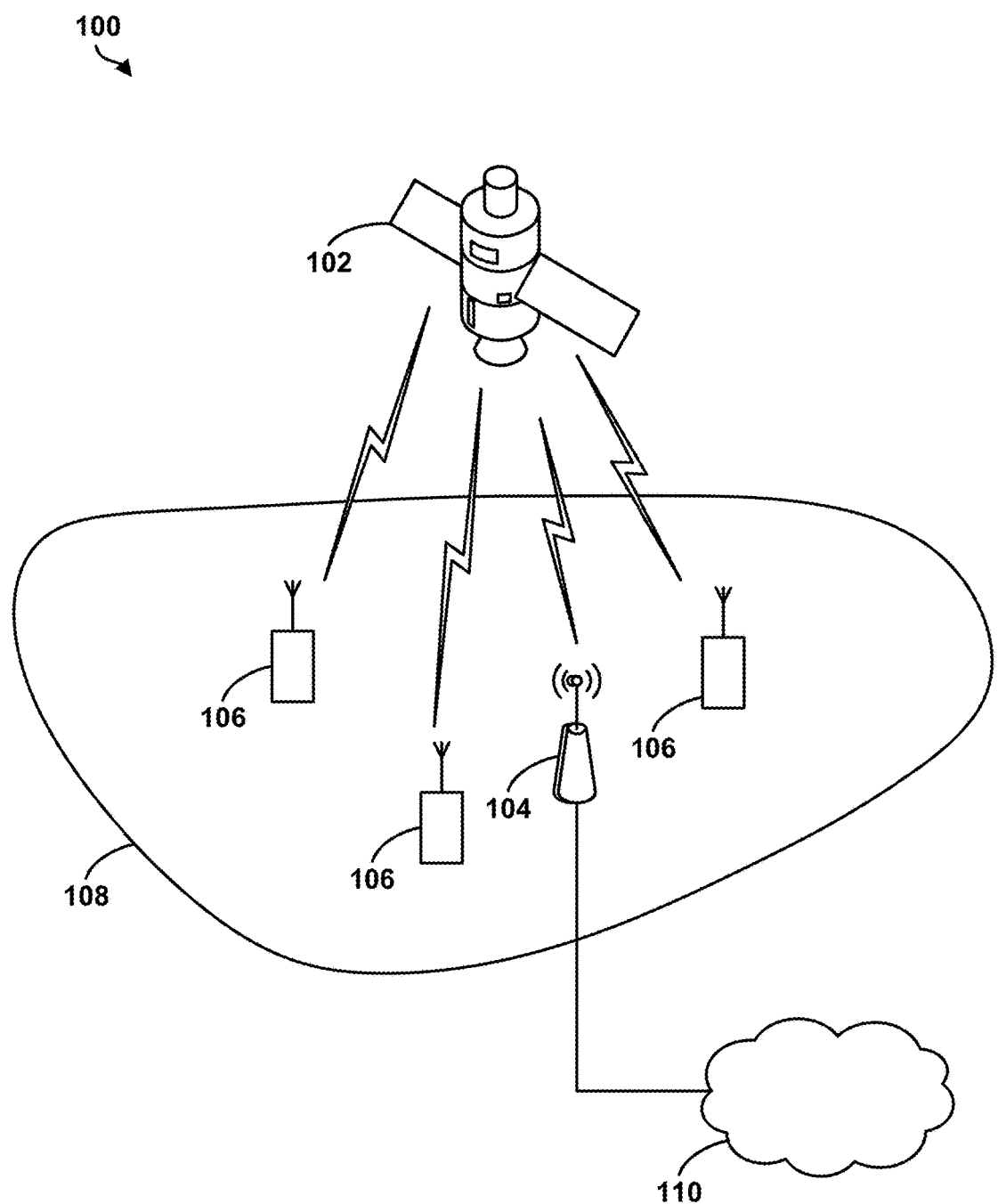
FIG. 1 shows an example computing system, according to an example implementation.

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Described herein are methods and systems for assigning spot beam colors to reduce interference in a communication system that employs reuse of spectrum. Regardless of reuse scheme, reuses between communication nodes operating on the same channel can be expressed by the distance between reuses. Frequency division multiplexed (FDM), time division multiplexed (TDM), and code division multiplexed (CDM) systems share this feature. Further, in systems that employ spot beams to provide isolation between reuses, performance is dominated by the closest reuses. Accordingly, the problem of assigning spot beams to different regions of a coverage area can be greatly simplified by focusing on conflicts (e.g., interference) between spot beams that are operating too close to each other. Put another way, the problem can be simplified by focusing on conflicts between pairs of spot beams whose pairwise interaction violates a maximum interference constraint.

In a communication system in which a communication node is configured to form multiple spot beams and communicate with devices that are located in multiple regions, an example method may involve obtaining a maximum interference constraint, and determining respective conflicts lists for one or more individual regions of the multiple regions. The conflicts lists for each individual region of the one or more individual regions can include at least one other region of the multiple regions for which a pairwise interaction with the individual region violates the maximum interference constraint.

In one instance, the maximum interference constraint can be a minimum distance criterion, and the conflicts list for each individual region of the one or more individual regions can include at least one other region of the multiple regions for which a distance between the individual region and the at least one other region is less than the minimum distance criterion. Alternatively, the maximum interference constraint can be a minimum isolation criterion, and the conflicts list for each individual region of the one or more individual regions can include at least one other region of the multiple regions for which an isolation value is less than the minimum isolation criterion. Determining the isolation value may involve determining a value of a cost function that quantifies a level of isolation between two spot beams.

The regions of the multiple regions can be adjacent, partially or fully overlapping, or disjoint. Accordingly, there may be some instances in which a given region of the multiple regions may have no other regions of the multiple regions for which a pairwise interaction with the given region violates the maximum interference constraint. By way of example, one region may be in Hawaii, and the other regions of the multiple regions may be in the continental United States. As such, the region in Hawaii may be disjoint from the regions in the continental United States. Further, for the region in Hawaii, there may be no other region for which a pairwise interaction between the region in Hawaii and the other region violates the maximum interference constraint. In other words, the conflicts list for the region in Hawaii may be empty or non-existent.

The method may also involve assigning spot beam colors to the multiple regions using the determined conflicts lists such that pairs of regions that violate the maximum interference constraint with respect to one another are assigned different spot beam colors. As an example, for a pair of regions that violates the maximum interference constraint, assigning the spot beam colors can include assigning a first spot beam color corresponding to a first communication profile to a first region of the pair and assigning a second spot beam color corresponding to a second communication profile to a second region of the pair of regions. The first communication profile and the second communication profile each define a respective orthogonal channel selected from a set of orthogonal channels permitted for use by the system. The orthogonal channels of the set may be orthogonal in polarization, time, frequency, and/or code. The first communication profile can define a first orthogonal channel, and the second communication profile can define a second orthogonal channel, with the first orthogonal channel and the second orthogonal channel being different from one another, such that devices in the first region and the second region communicate using different orthogonal channels. For regions that do not have a conflicts list, any spot beam color can be safely assigned to the region, since the region may have no other regions among the multiple regions that produce an unacceptable level of interference. After assigning the spot beam colors using the determined conflicts lists, a controller may then cause the communication node to configure the multiple spot beams in accordance with the assigned spot beam colors.

Advantageously, the methods presented herein allow for quickly assigning spot beam colors. While the optimization of coloring to minimize interference is fundamentally a solution space that is factorial in size, the methods presented herein achieve results in less than $O(N^2)$ time, where N is the number of regions. As such, the methods can be carried out to quickly assign spot beam colors in dynamic environments featuring mobile devices.

In some examples, the conflicts lists for respective regions are maintained as jagged arrays, reducing the memory requirements for carrying out the method. For instance, rather than storing, for each region, data indicative of the pairwise interaction between the region and every other region, a computing device can selectively store only indications of other regions whose pairwise interaction with the region violates a maximum interference constraint. As one example, where the maximum interference constraint is a minimum distance criterion, the computing device can selectively store data indicative of the regions that are less than a minimum distance away from the region. With this approach, the conflicts lists for different regions can be different lengths, leading to a "jagged" data structure.

Various other features of these methods and systems are described hereinafter with reference to the accompanying figures.

Referring now to FIG. 1, FIG. 1 shows an example communication system 100. As shown, the communication system 100 includes one or more satellites 102, one or more ground base stations 104, and one or more user devices 106. The satellite 102 may cover a geographic region 108 in which the ground base stations 104 and the user devices 106 may be located. The ground base station 104 may be coupled to or otherwise part of one or more networks 110, such as the Internet, a public switched telephone network (PSTN), private networks such as corporate and government networks, and/or other servers and services.

In various examples, the satellite 102 and ground base station 104 may enable communication between user devices 106 and the network 110. In this regard, the ground base station 104 may receive information (e.g., data) from the network 110, and communicate the information to the satellite 102. The satellite 102 may in turn transmit or relay the information to one or more user devices 106. Conversely, the satellite 102 may receive information from a user device 106, and communicate the information to the ground base station 104, which may in turn transmit or relay the information to the network 110. This type of communication may at times be referred to as "bent-pipe" communication. It should be understood, however, that example implementations may also be applicable to other types of satellite systems, such as those with on-board packet switching.

The satellite 102 may employ a number of spot beams providing a beam laydown that forms coverage over the geographic region 108, which may divided into multiple regions. The spot beams in one example may cover respective regions of the multiple regions. Each spot beam may be assigned some beam indicia in accordance with a frequency reuse scheme. In some examples, the beam indicia may be spot beam colors corresponding to respective communication profiles. The communication profiles may vary depending on the set of orthogonal channels permitted for use by the satellite 102. For instance, there may be four spot beam colors corresponding to four different frequency bands. Or there may be four spot beam colors, with a first spot beam color corresponding to a first frequency band and first polarization, a second spot beam color corresponding to the first frequency band and a second polarization, a third spot beam color corresponding to a second frequency band and the first polarization, and a fourth spot beam color corresponding to the second frequency band and the second polarization. As another example, there may be four spot beam colors corresponding to four different orthogonal channels that are orthogonal in time and/or code. In other examples, there may be more or less spot beam colors, such as three spot beam colors, five spot beam colors, or three hundred spot beam colors. The number of colors and the number of regions is unlimited by the methods described.

In accordance with example implementations, the satellite 102 may use the same communication profile at the same time for two or more of the multiple regions. That is, the satellite 102 may reuse the same communication profile in different spot beams with the same assigned spot beam color.

Figure 2:
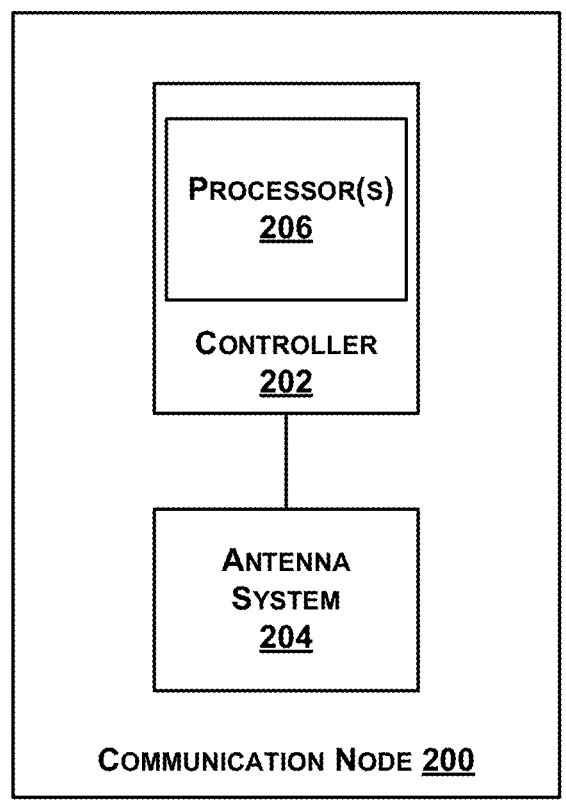
FIG. 2 shows an example communication node, according to an example implementation.

FIG. 2 shows an example communication node 200. In one example, the communication node 200 may correspond to a component of the satellite 102 of FIG. 1. For instance, the communication node 200 may correspond to a satellite transmitter or satellite receiver. In another example, the communication node 200 may correspond to a component of the ground base station 104 of FIG. 1. Alternatively, the communication node 200 may correspond to a transmitter, receiver, or transceiver in a communication system other than the communication system 100 of FIG. 1.

As shown, the communication node 200 includes a controller 202 and an antenna system 204. In one example, the communication node 200 maybe configured to lay down beams covering respective regions of a communication system, such as the geographic region 108 of FIG. 1.

The controller 202 may include one or more processors 206 that are configured to execute computer-readable instructions. The processors 206 may be any type of processor, such as a microprocessor, digital signal processor, multicore processor, etc.

The antenna system 204 may be of any type capable of forming spot beams, including but not limited to direct radiating phased arrays, or array fed reflector type configurations. The antenna system 204 can include at least one array of antenna feeds, and possibly also one or more reflectors. If reflectors are included in the antenna system 204, each reflector may serve one of a plurality of spot beams and may have in its focal plane an array of antenna feeds, which may generate beams in the region of interest.

In operation, the controller 202 may configure and control the antenna system 204. For instance, the controller 202 may assign spot beam colors to various beams, and cause the antenna system 204 to lay down beams covering respective regions in accordance with the assigned spot beam colors.

Figure 3:
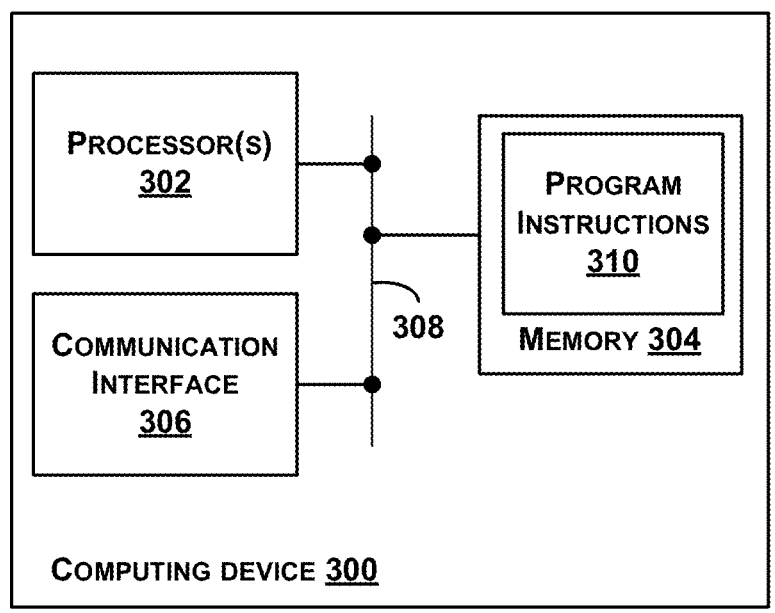
FIG. 3 shows an example computing device, according to an example implementation.

FIG. 3 shows an example computing device 300. In one example, the computing device 300 may correspond to the controller 202 of FIG. 2. For instance, the controller 202 of FIG. 2 may include the various components shown in FIG. 3. Alternatively, the computing device 300 may be a computing device that is separate from the controller 202 of FIG. 2, but configured to assign spot beam colors to various regions and provide instructions to the controller 202 for configuring the spot beam colors.

As shown in FIG. 3, the computing device 300 may include one or more processors 302, a memory 304, and a communication interface 306. Components illustrated in FIG. 3 may be linked together by a system bus, network, or other connection mechanism 308. The computing device 300 may also include hardware to enable communication within the computing device 300 and between the computing device 300 and one or more other devices. The hardware may include transmitters, receivers, and antennas, for example.

The one or more processors 302 may be any type of processor, such as a microprocessor, digital signal processor, multicore processor, etc., coupled to the memory 304. The memory 304 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the memory 304 may be configured to store program instructions 310. The program instructions 310 may be executable by the one or more processors 302 to cause the computing device 300 to perform one or more functions. For instance, the program instructions 310 may be executable to cause the computing device 300 to obtain a maximum interference constraint, determine respective conflicts list for one or more individual regions, assign spot beam colors using the determined conflicts lists, and cause a communication node to configure the multiple spot beams in accordance with the assigned spot beam colors. The program instructions 310 may also be executable to cause the one or more processors 302 to perform other functions, such as any of the functions described herein.

The communication interface 306 may be configured to facilitate communication with one or more other devices, in accordance with one or more wired or wireless communication protocols. For example, the communication interface 306 may be configured to facilitate wireless data communication for the computing device 300 according to one or more wireless communication standards, such as one or more IEEE 801.11 standards, ZigBee standards, Bluetooth standards, etc. As another example, the communication interface 306 may be configured to facilitate wired data communication with one or more other devices.

Figure 4:
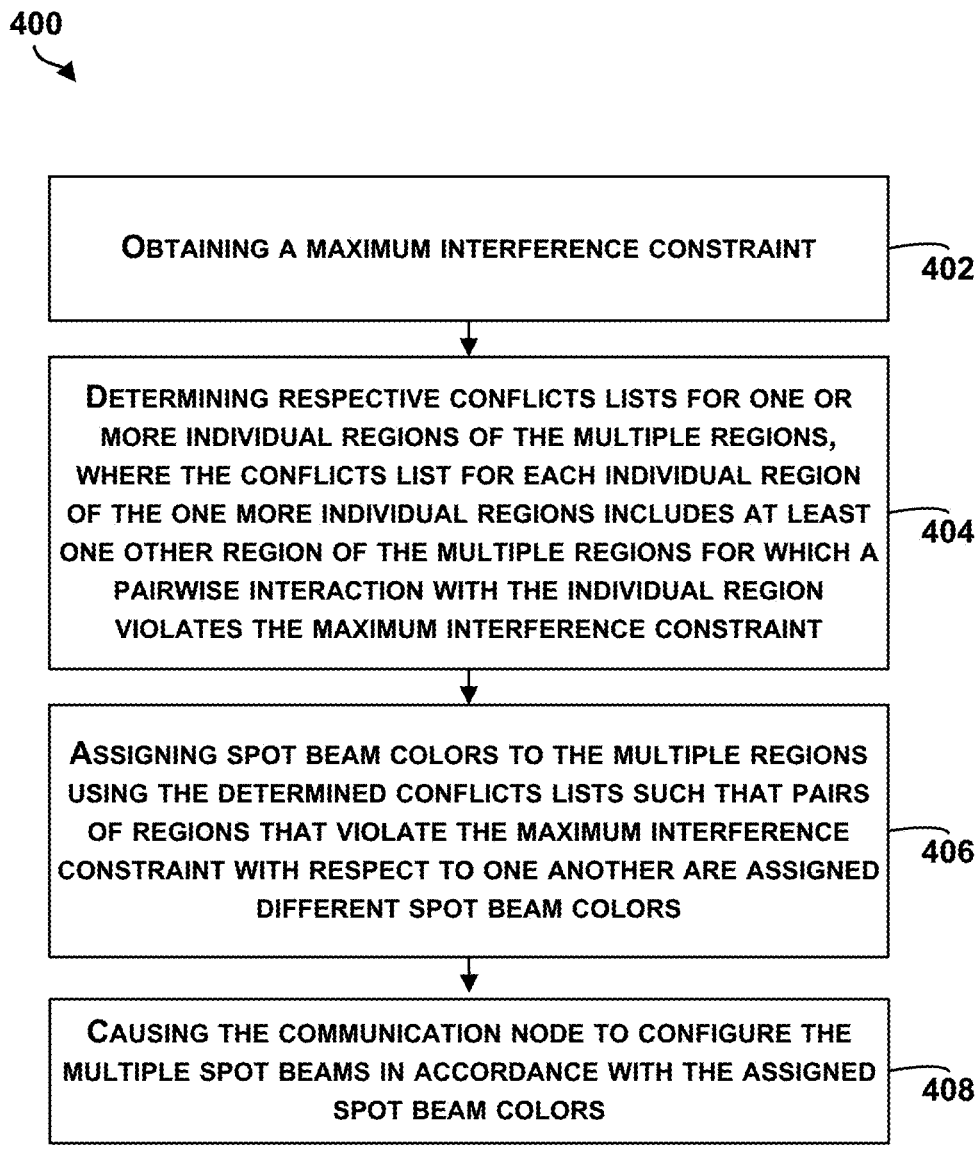
FIG. 4 shows a flow chart of an example method, according to an example implementation.

FIG. 4 shows a flow chart of an example method 400 for coordinating reuse of spectrum in a communication system. The communication system may be similar to the communication system 100 of FIG. 1. For instance, the communication system may include a communication node that is configured to form multiple spot beams and communicate with devices that are located in multiple regions.

Method 400 shown in FIG. 4 presents an implementation of a method that, for example, could be carried out by the computing device 300 of FIG. 3. It should be understood that for this and other processes and methods disclosed herein, flowcharts show functionality and operation of one possible implementation of present implementations. Alternative implementations are included within the scope of the example implementations of the present disclosure in which functions may be executed out of order from that shown or discussed, including substantially concurrent or in reverse order, depending on the functionality involved, as would be understood by those reasonably skilled in the art.

Further, each block of this and other methods may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer readable media that stores data for short periods of time like register memory, processor cache, and RAM. The computer readable media may also be any other volatile or non-volatile storage systems. The computer readable medium may be considered a tangible computer readable storage medium, for example.

At block 402, the method 400 includes obtaining a maximum interference constraint. Obtaining the maximum interference constraint may involve obtaining a stored value from a database or receiving a value from another computing device. In one example, the maximum interference constraint may be a minimum distance criterion. For instance, the maximum interference constraint may be a desired minimum distance between reuses of the same communication profile by different spot beams. The minimum distance may be a function of a beam diameter of a spot beam and a number of spot beams in a coloring scheme. As an example, the minimum distance may be a function of a half-power beamwidth of the beam multiplied by a square root of the number of spot beam colors. In another example, the maximum interference constraint may be a desired level of isolation between spot beams.

At block 404, the method 400 includes determining respective conflicts lists for one or more individual regions of the multiple regions. The conflicts list for each individual region of the one or more individual regions may include at least one other region of the multiple regions for which a pairwise interaction with the individual region violates the maximum interference constraint.

In one example, determining the respective conflicts for an individual region may involve determining a pairwise interaction between the individual region and one or more other regions, such as other regions that are within a distance threshold of the region, and, including the one or more other regions in the conflict list if the pairwise interaction violates the maximum interference constraint. Accordingly, the type of pairwise interaction may vary, depending on the form of the maximum interference constraint. By way of example, for a maximum interference constraint in the form of a minimum distance criterion, determining the pairwise interaction between the individual region and another region may involve determining a distance between the individual region and the other region. The distance may be measured from a center of the individual region to a center of the other region, or the distance may be measured from a center of the individual region to a nearest edge of the other region. If the distance is less than the minimum distance criterion, the other region may be included in the conflicts list for the individual region.

Alternatively, if the maximum interference constraint is a desired level of isolation between spot beams, determining the pairwise interaction between the individual region and the other region may involve determining a value of a cost function that quantifies a level of isolation between a first spot beam corresponding to the individual region and a second spot beam corresponding to the other region. If the value of the cost function is less than the desired level of isolation, the other region may be included in the conflicts list for the individual region.

In some examples, respective conflicts lists may be determined for each region of the multiple regions. The conflicts lists for each region may be different lengths; some conflicts lists may have zero regions, while other conflicts lists may have one or multiple regions. While determining the conflicts list for an individual region, if the pairwise interaction between the individual region and another region does not violate the maximum interference constraint, the pairwise interaction with the other region may be ignored and the other region may be omitted from the conflicts list for the individual region. In line with the discussion above, the conflicts lists for respective regions may be maintained as jagged arrays, reducing the memory requirements for carrying out the method. For instance, the conflicts may be stored as a vector of vectors.

At block 406, the method 400 includes assigning spot beam colors to the multiple regions using the determined conflicts lists such that pairs of regions that violate the maximum interference constraint with respect to one another are assigned different spot beam colors. In one example, assigning the spot beam colors may involve forming an ordered list of spot beam colors. The number of entries in the ordered list may be on the order of the number of regions. For instance, if there are ten regions, the ordered list may be "spot beam color 1; spot beam color 2; spot beam color 3; spot beam color 4; . . . spot beam color 10". Further, spot beam colors may then be selected from the ordered list for each of the conflicts list.

By way of example, in a scenario where there are ten regions, a first region may have a respective conflicts list which includes region 2 and region 4. For the first region, a first spot beam color in the ordered list (i.e., spot beam color 1) may be assigned. For the first region in the conflicts list (i.e., region 2), a lowest numbered spot beam color from the ordered list other than a spot beam color assigned to the first region or any other region in the conflicts list may be selected. Hence, region 2 may be assigned spot beam color 2. Using a similar approach, region 4 may be assigned spot beam color 3. These results are shown in Table 1 below.

TABLE 1

| Region | Assigned Spot Beam Color |
|---|---|
| 1 | spot beam color 1 |
| 2 | spot beam color 2 |
| 3 | spot beam color 1 |
| 4 | spot beam color 3 |
| 5 | spot beam color 3 |

After assigning spot beam colors to region 1 and the regions in the conflicts lists for region 1, spot beam colors may then similarly be assigned to the regions in the conflicts list for region 2. For instance, if region 3 and region 5 are in the conflicts list for region 2, spot beam color 1 may be assigned to region 3, since spot beam color 1 is the lowest numbered spot beam color in the ordered list that is not assigned to region 2 or region 5. And spot beam color 3 may then be assigned to region 5, since spot beam color 3 is the lowest numbered spot beam color in the ordered list that is not assigned to region 2 or region 3. These results are shown in Table 1. This process may be repeated for the remaining conflicts lists for the other eight regions.

The above approach to assigning spot beam colors (i.e., based on the lowest numbered spot beam color) may yield a relatively uneven distribution of spot beam colors, since the spot beam colors in the beginning of the list are more likely to be assigned.

In another approach, the number of spot beam colors in the ordered list may be a fixed, limited number. Where the number of spot beam colors is limited, spot beam colors may be assigned to another region in a conflicts list for an individual region by assigning to the other region a least-frequently assigned spot beam color from the list of spot beam colors other than a spot beam color assigned to the individual region or any other region in the conflicts list. This approach (i.e., assigning based on the least-frequency used spot beam colors) may yield a more even distribution of spot beam colors.

Further, the two approaches to assigning spot beam colors can be combined. For instance, initially, spot beam colors can be assigned using an ordered list that has ten spot beam colors, with the assignment of spot beam colors based on the lowest numbered spot beam color. As noted above, the initial assignment may yield an uneven distribution. However, assigning the spot beam colors using the first ordered list may indicate a reasonable number of spot beam colors to use for the ten regions. For instance, the results of the assignment may indicate that only five of the spot beam colors were used (i.e., the first five in the ordered list). Accordingly, spot beam colors may then be reassigned using an ordered list of spot beam colors having around five different spot beam colors (e.g., four spot beam colors, five spot beam colors, or six spot beam colors), with the assigning based on the least-frequently assigned spot beam color.

After assigning the spot beam colors, at block 408, the method 400 then includes causing the communication node to configure the multiple spot beams in accordance with the assigned spot beam colors. Causing the communication node to configure the multiple spot beams may involve transmitting to the communication node a file including a mapping between spot beams and assigned spot beam colors. Alternatively, causing the communication node to configure the multiple spot beam colors may involve determining, based on the assigned spot beam colors, a mapping between spot beams and communication profiles, and transmitting a file including the mapping between spot beams and communication profiles to the communication node.

Figure 5:
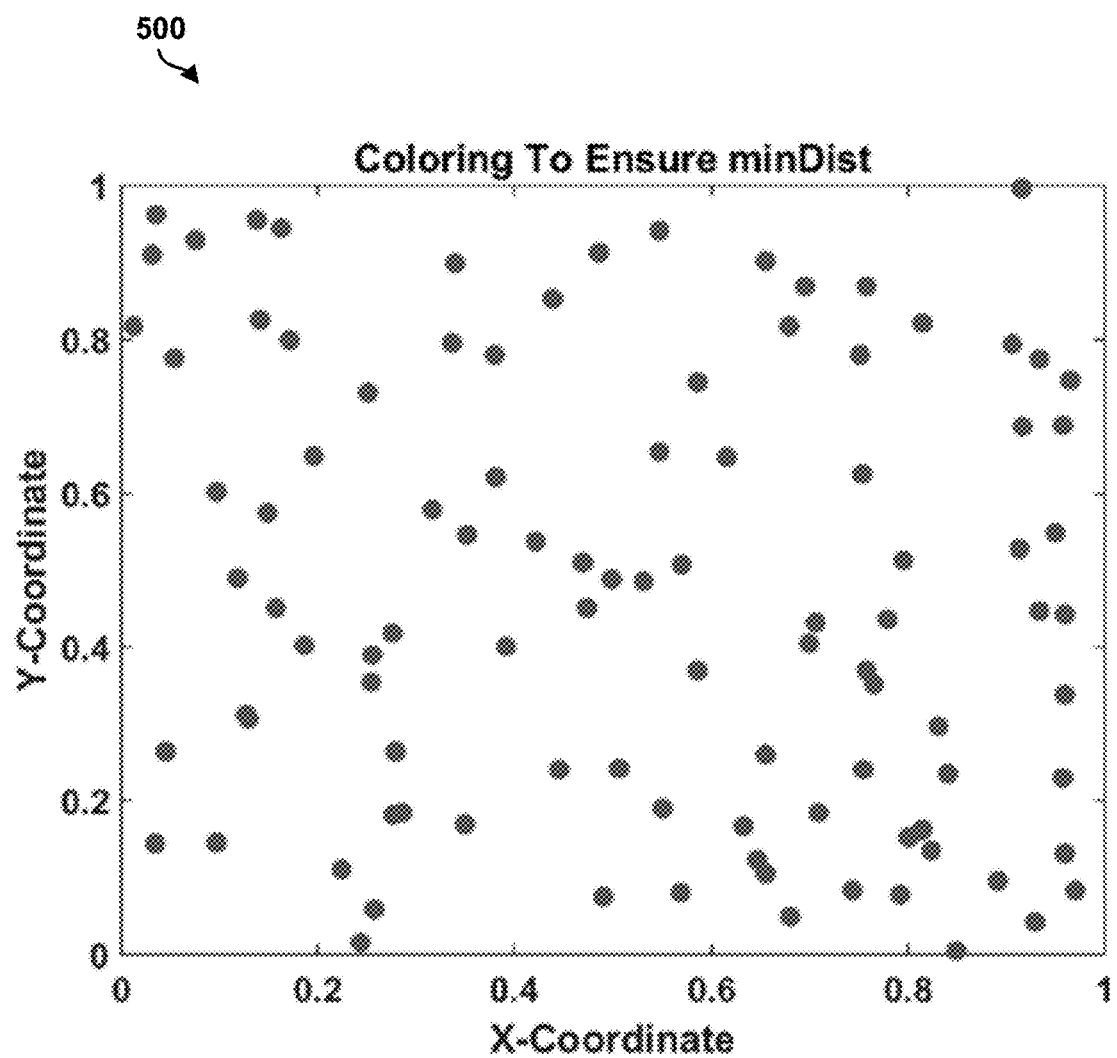
FIG. 5 shows a graph indicating an example distribution of devices, according to an example implementation.

An example implementation of the method 400 is now described with reference to FIGS. 5-12. FIG. 5 shows a graph 500 indicating an example distribution of devices in a coverage area. In particular, FIG. 5 shows one hundred devices that are non-uniformly distributed throughout a coverage area. The one hundred devices are located at various points indicated by x, y coordinates ranging from zero to one, with each point representing a respective device. Each point may correspond to a respective region for which a communication node is configured to provide a spot beam.

Figure 6:
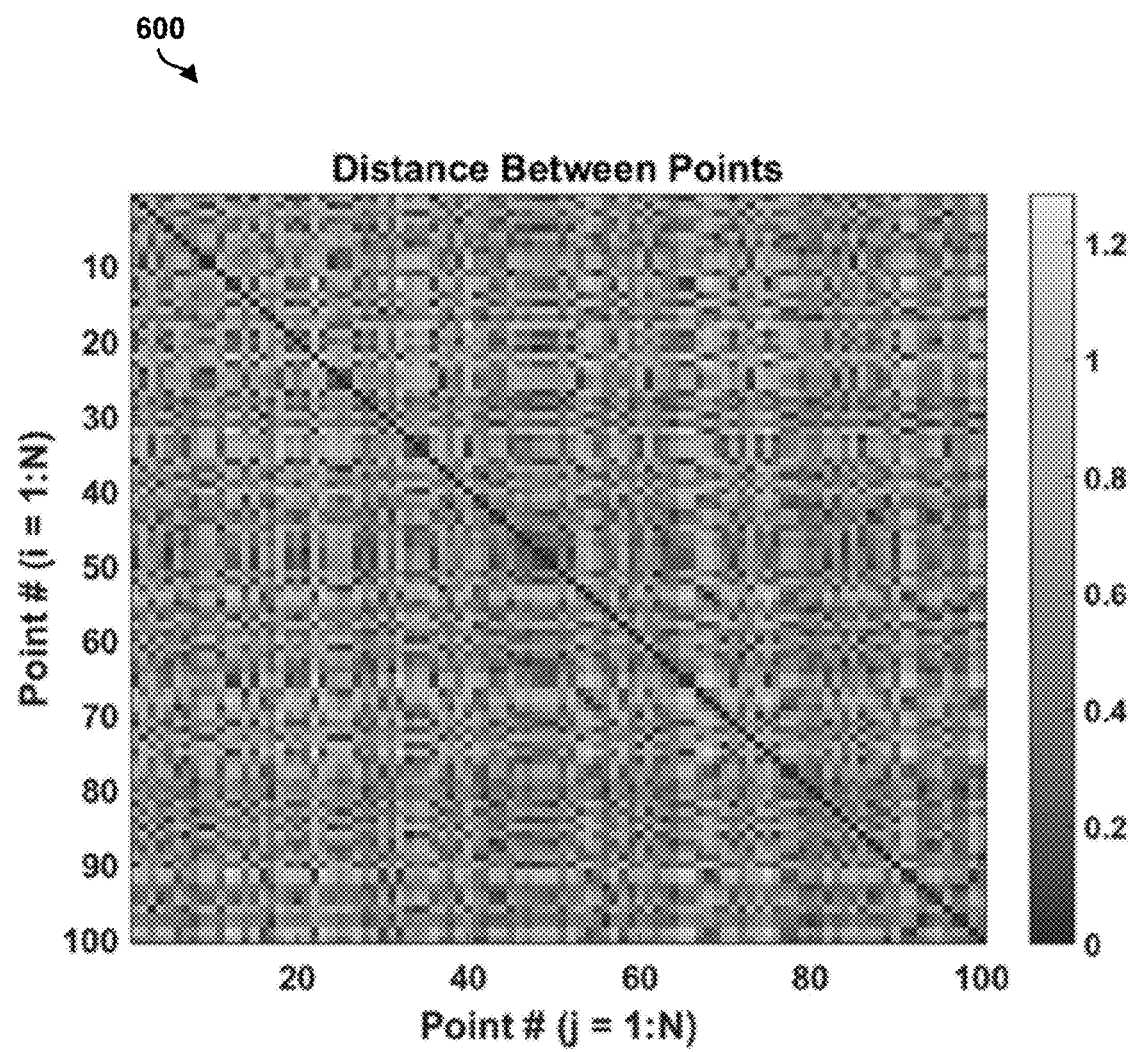
FIG. 6 shows a graph of distances between points in the distribution of devices of FIG. 5.

FIG. 6 shows a graph 600 of distances between points in the distribution of devices of FIG. 5. As shown in FIG. 6, the distances between points range from 0 units to about 1.2 units. In line with the discussion above, where the maximum interference constraint is a minimum distance criterion, the conflicts list for each region includes any other regions for which a distance between the region and the other region is less than the minimum distance criterion.

Figure 7:
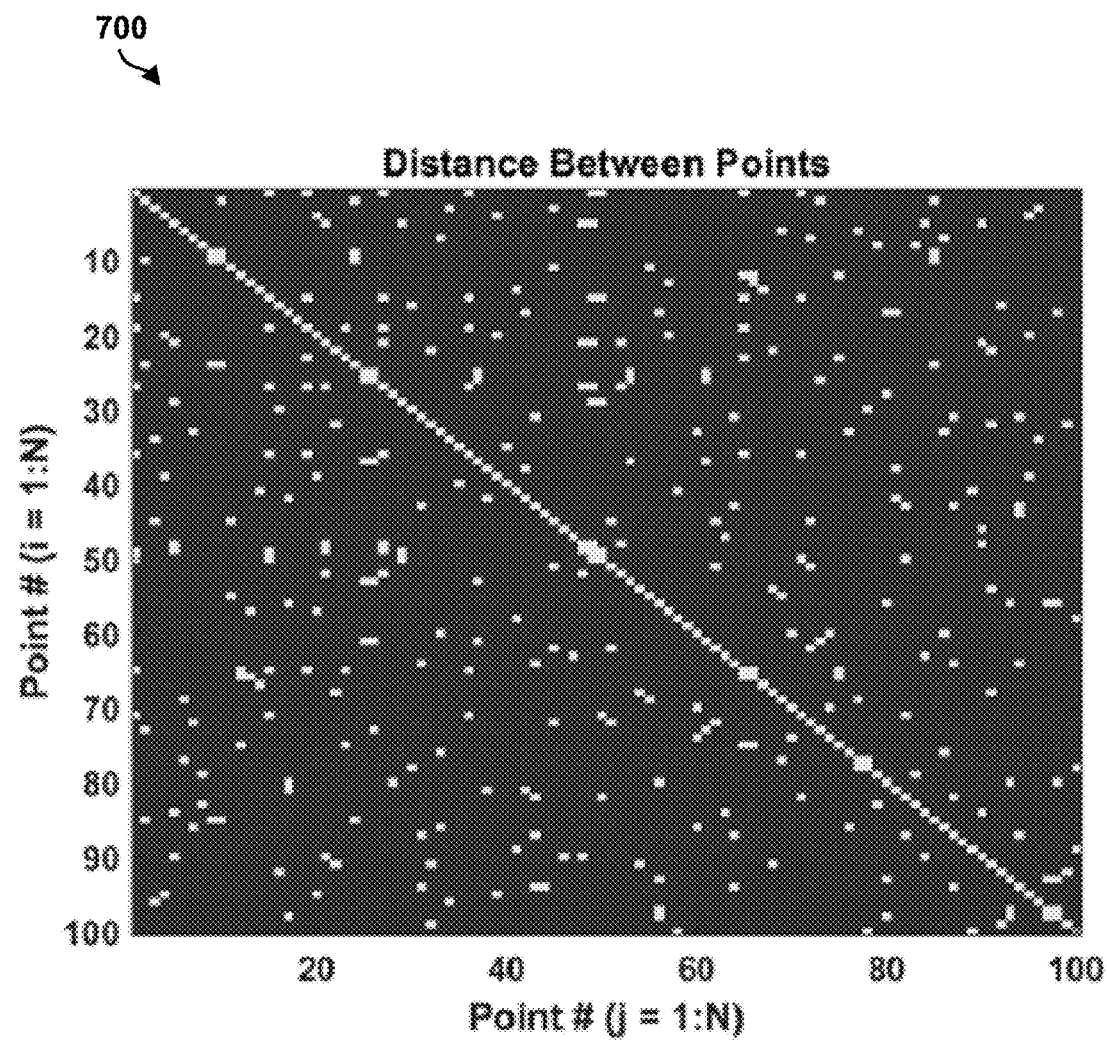
FIG. 7 shows a graph that is filtered version of the graph of FIG. 6.

FIG. 7 shows a graph 700 that is filtered version of the graph 600 of FIG. 6. In particular, the graph 700 shows only the distances from the graph 600 of FIG. 6 that are less than a minimum distance criterion. For the graph 700 of FIG. 7, the minimum distance criterion was chosen to be approximately 0.11 units. The graph 700 provides a conceptual illustration of which points will have pairwise interactions with other points that violate the minimum distance criterion. Put another way, the graph 700 provides a conceptual illustration of which points are operating "too close" to other points. The example is not meant to be limiting however. In other examples, one point may be deemed to be operating "too close" to another point for other reasons, such as if the spot beam for one point is operating within a side lobe of the spot beam for another point.

Figure 8:
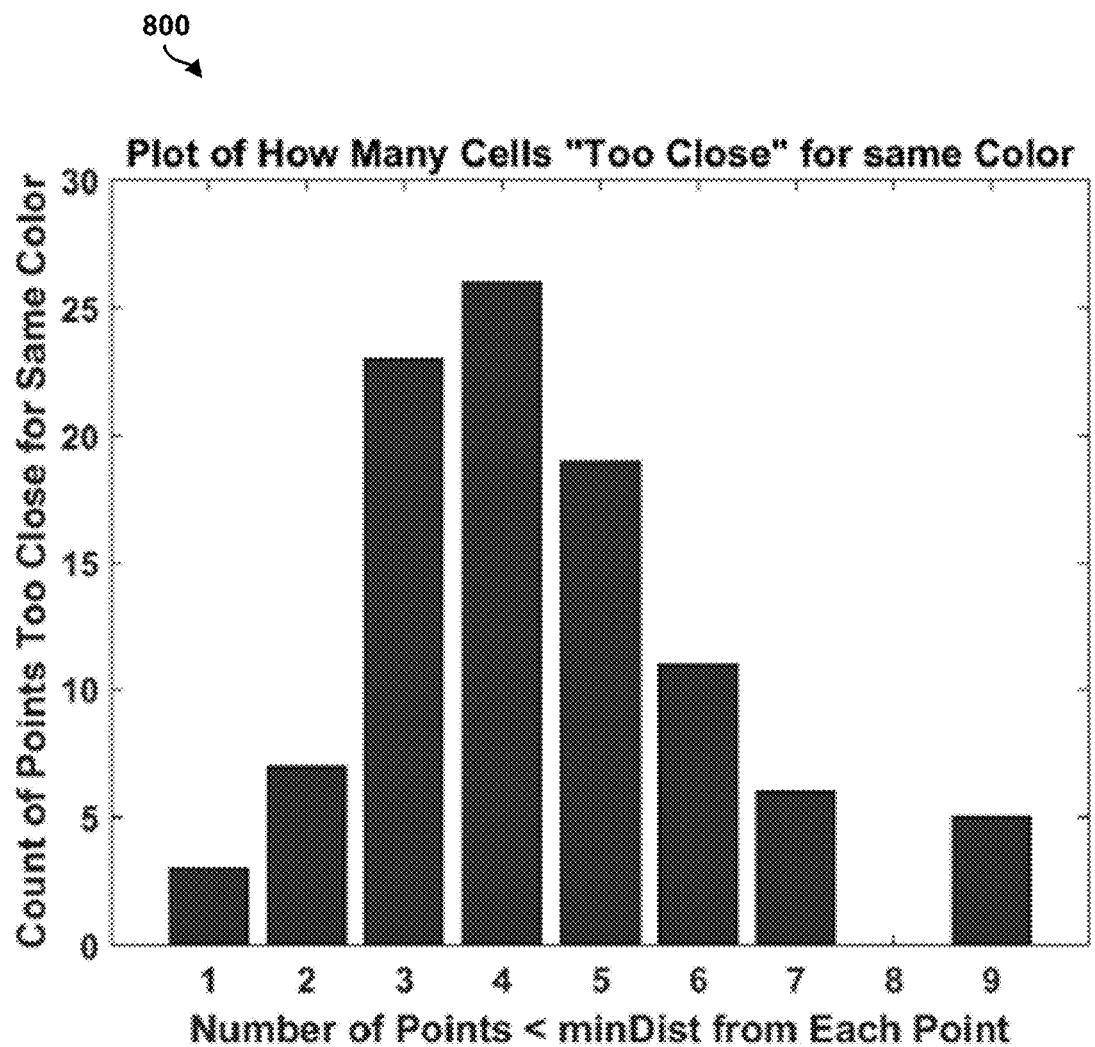
FIG. 8 shows a histogram, according to an example implementation.

FIG. 8 shows a histogram 800 indicating how many other points are within the minimum distance criterion for each point in the distribution of devices of FIG. 5. As shown in FIG. 8, the number of other points within the minimum distance criterion of an individual point ranges from one other point to nine other points, with four points being the most common number. The counts from the histogram 800 are indicative of the number of regions in the conflicts list for each region.

Figure 9:
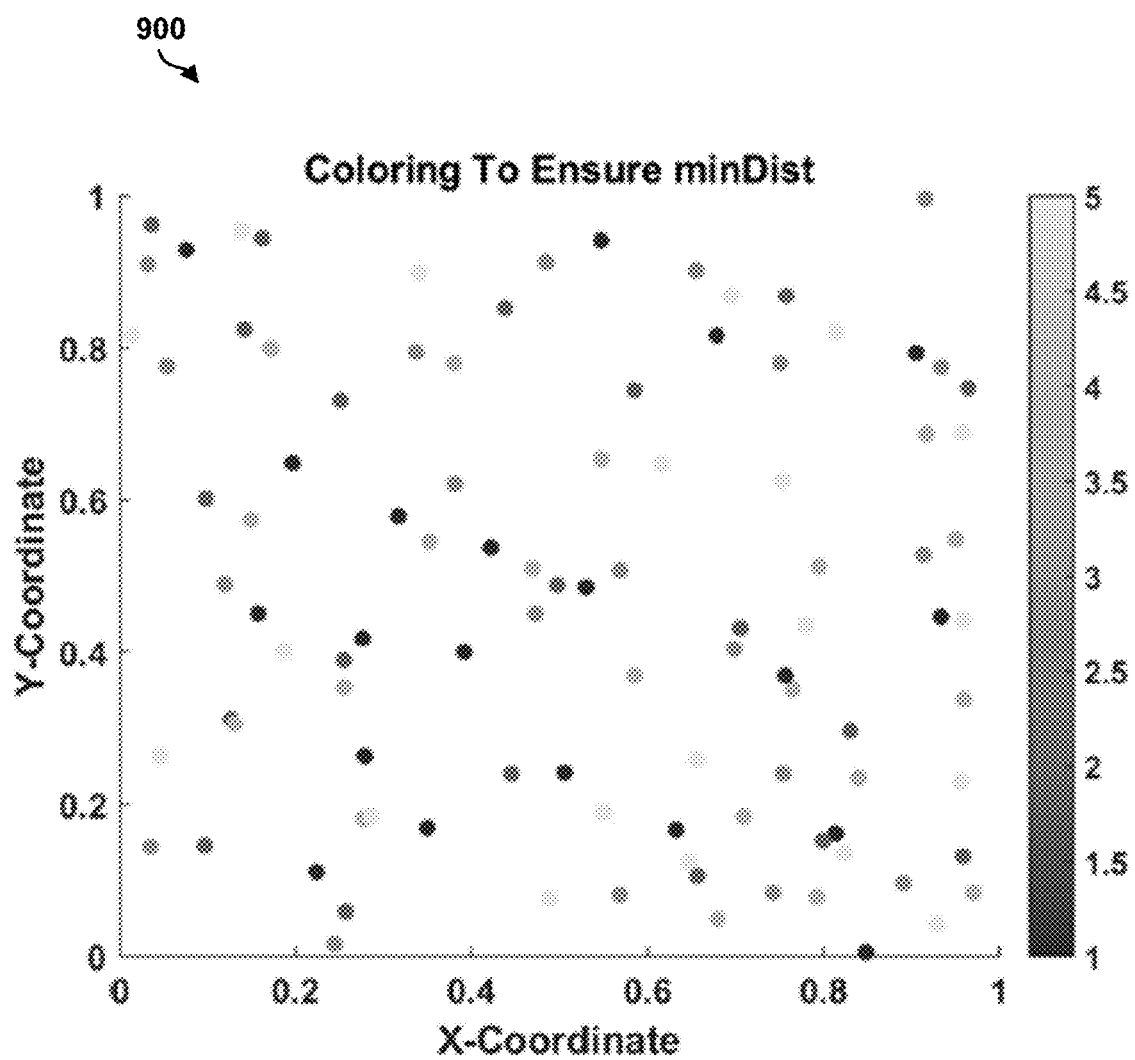
FIG. 9 shows a graph indicating an example assignment of spot beam colors, according to an example implementation.

FIG. 9 shows a graph 900 indicating an example assignment of spot beam colors. In particular, the graph 900 shows an example assignment of spot beam colors using conflicts list derived from the minimum distance (e.g., minDist) criterion of 0.11 units. The graph 900 indicates that one of five spot beam colors is assigned to each point in the distribution of devices of FIG. 5. The assignment of spot beam colors shown in the graph 900 was achieved by initially assigning spot beam colors using an ordered list of ten spot beam colors, with the assignment of spot beam colors based on the lowest numbered spot beam color. The spot beam colors were then reassigned using an ordered list of five spot beam colors, with the assigning based on the least-frequently assigned spot beam color. That process yielded an even distribution of spot beam colors among the one hundred points.

Figure 10:
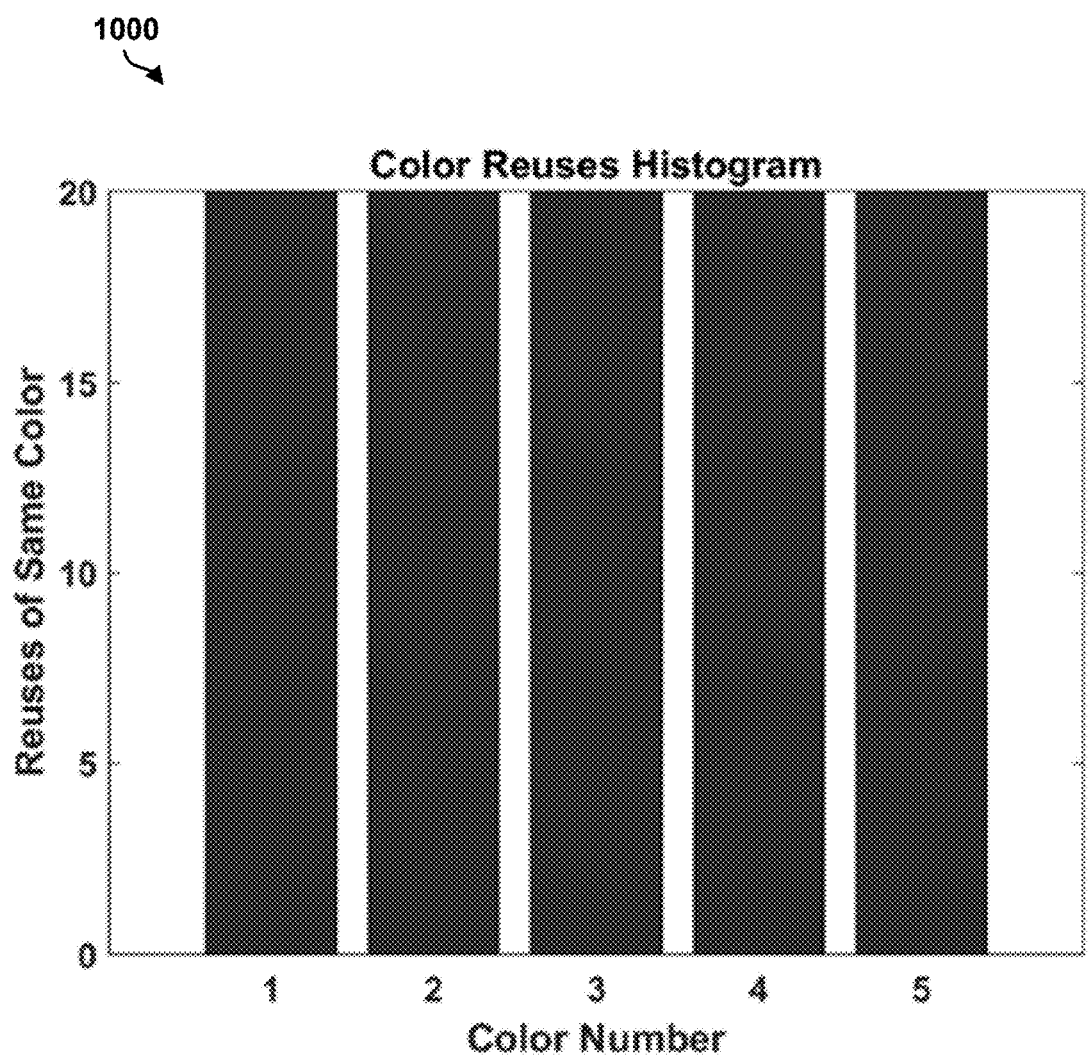
FIG. 10 shows a histogram, according to an example implementation.

FIG. 10 shows a histogram 1000 indicating how many times each spot beam color was reused in the assignment of spot beam colors depicted in FIG. 9. As shown, each of the five spot beam colors was assigned 20 times. Thus, in a communication system configured according to the assignment of spot beam colors depicted in FIG. 9, there are twenty reuses of each spot beam color.

Figure 11:
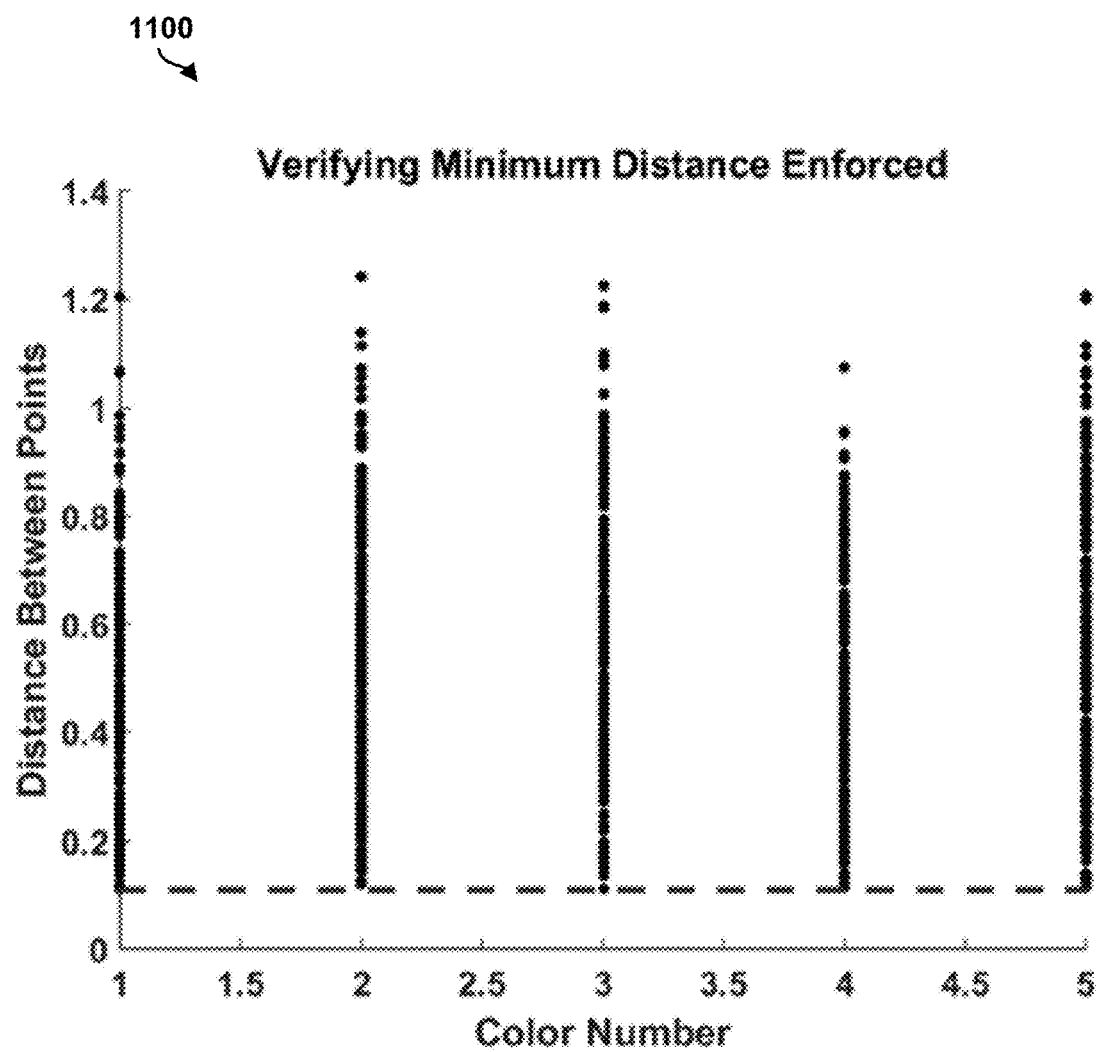
FIG. 11 shows a graph, according to an example implementation.

FIG. 11 shows a graph 1100 indicating the distances between points having the same assigned spot beam color for the assignment of spot beam colors depicted in FIG. 9. As shown, for all of the points having spot beam color 1 assigned, the distance between each other point having spot beam color 1 assigned is greater than the minimum distance criterion of 0.11, for example. Similar results are shown for the other spot beam colors. Hence, the assignment of spot beam colors shown in FIG. 9 has enforced the minimum distance criterion for all of the points.

Figure 12:
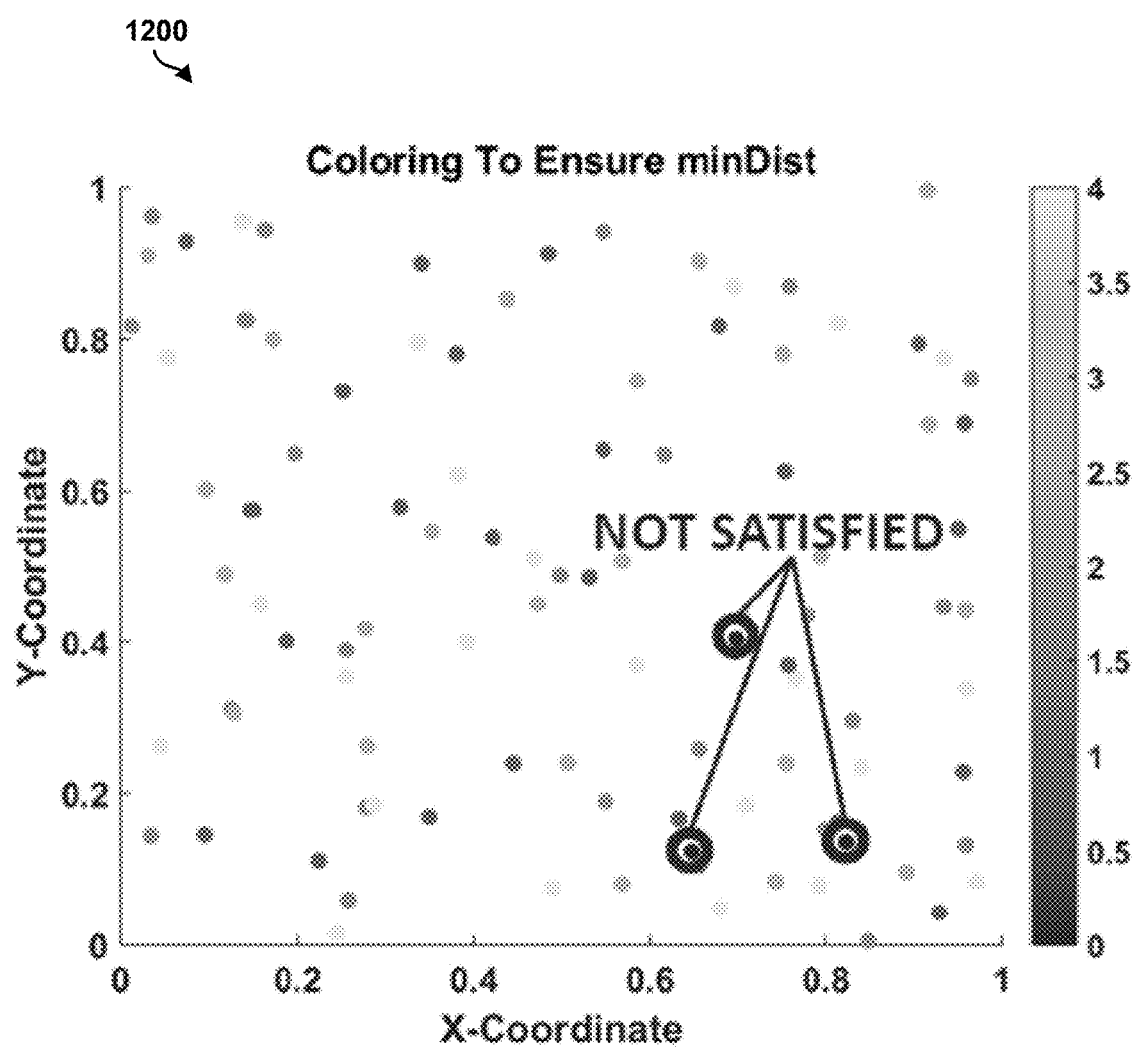
FIG. 12 shows a graph indicating another example assignment of spot beam colors, according to an example implementation.

FIG. 12 shows a graph 1200 indicating another example assignment of spot beam colors. In particular, the graph 1200 indicates that one of four spot beam colors is assigned to each point in the distribution of devices of FIG. 5. The assignment of spot beam colors shown in the graph 1200 was achieved by limiting the number of spot beam colors to four. As indicated in the graph 1200, with this approach, a spot beam color was not assigned to three out of the 100 points, since when attempting to assign a spot beam color to the three points using the method disclosed herein, all four of the spot beam colors were already assigned to other points in the respective conflicts lists for the three points. The three points are labeled as "NOT SATISFIED" in the graph 1200. Even though some of the spot beam colors were unassigned, a system operator might still use this assignment in a scenario where system throughput is more important than the number of users served, since the available bandwidth to 97 out of 100 users would be ⅝ths of the bandwidth assigned to each user in the five color scenario.

Figure 13:
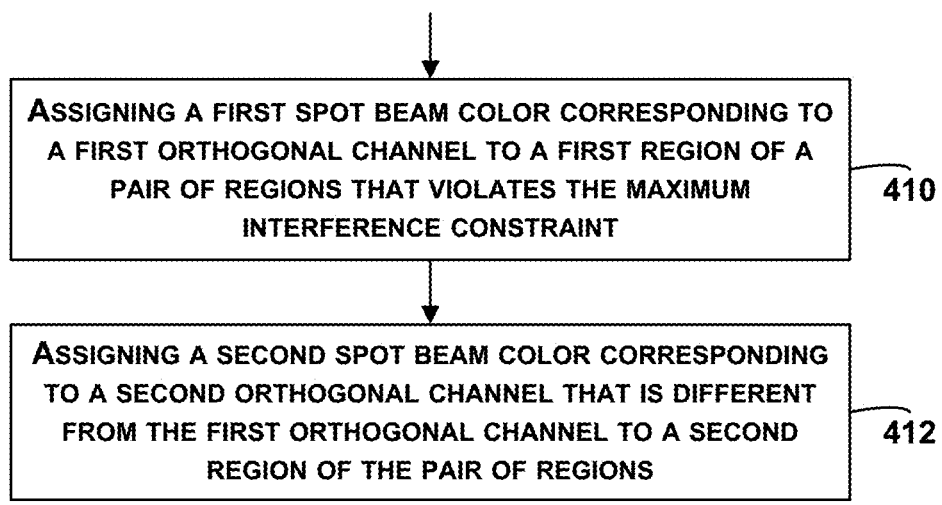
FIG. 13 shows a flow chart of another example method for use with the method shown in FIG. 4, according to an example implementation.

FIG. 13 shows a flow chart of another example method for use with the method shown in FIG. 4, according to an example implementation. Block 410 and block 412 of FIG. 13 could be performed as part of the assigning spot beam colors at block 406 of FIG. 4. At block 410, FIG. 13 includes assigning a first spot beam color corresponding to a first orthogonal channel to a first region of a pair of regions that violates the maximum interference constraint. And at block 412, FIG. 13 includes assigning a second spot beam color corresponding to a second orthogonal channel that is different from the first orthogonal channel to a second region of the pair of regions. The first orthogonal channel and the second orthogonal channel are orthogonal in frequency, polarization, time, and/or code.

Figure 14:
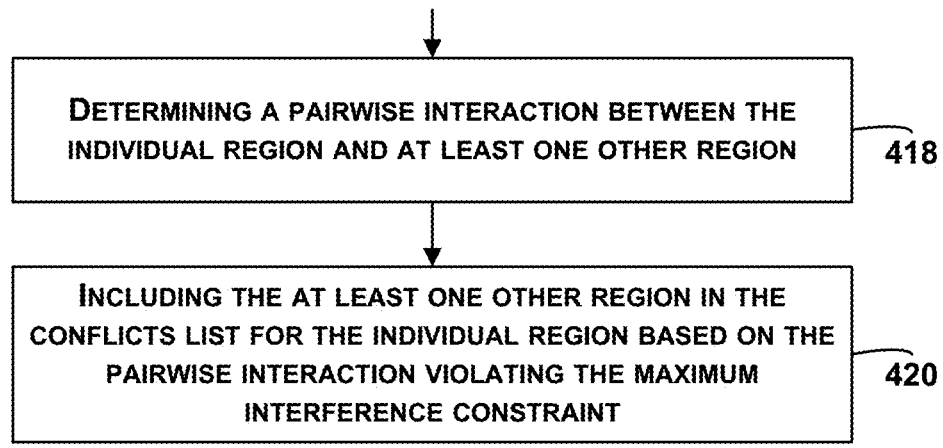
FIG. 14 shows a flow chart of another example method for use with the method shown in FIG. 4, according to an example implementation.

FIG. 14 shows a flow chart of another example method for use with the method shown in FIG. 4, according to an example implementation. Blocks 418 and 420 could be performed as part of the determining conflicts lists at block 404 of FIG. 4. At block 418, FIG. 14 includes determining a pairwise interaction between the individual region and at least one other region. And at block 420, FIG. 14 includes including the at least one other region in (e.g., adding the at least one other region to) the conflicts list for the individual region based on the pairwise interaction violating the maximum interference constraint.

Figure 15:
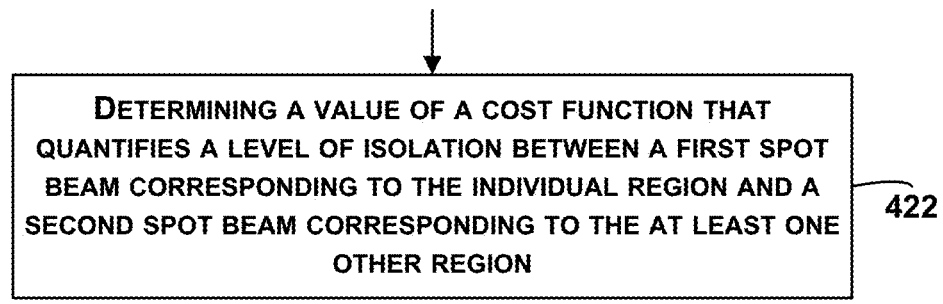
FIG. 15 shows a flow chart of another example method for use with the method shown in FIG. 4, according to an example implementation.

FIG. 15 shows a flow chart of another example method for use with the method shown in FIG. 4, according to an example implementation. Block 422 could be performed as part of the determining a pairwise interaction at block 418 of FIG. 14. At block 422, FIG. 15 includes determining a value of a cost function that quantifies a level of isolation between a first spot beam corresponding to the individual region and a second spot beam corresponding to the at least one other region.

Figure 16:
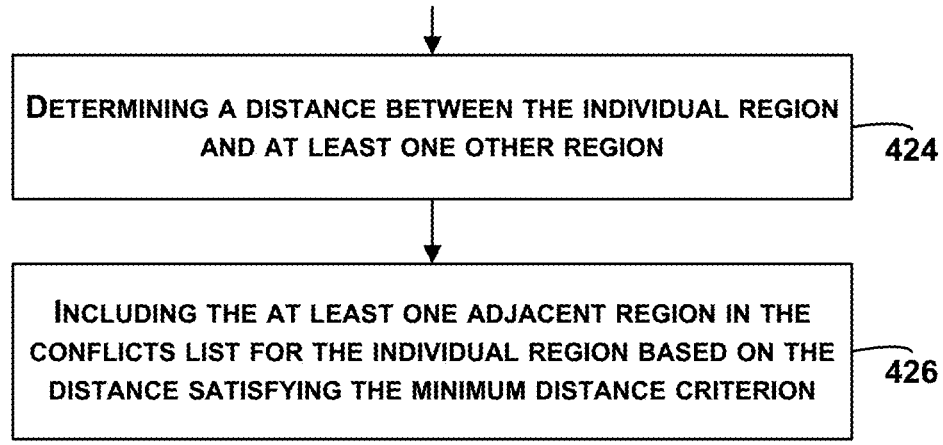
FIG. 16 shows a flow chart of another example method for use with the method shown in FIG. 4, according to an example implementation.

FIG. 16 shows a flow chart of another example method for use with the method shown in FIG. 4, according to an example implementation. Block 424 and block 426 could be performed as part of the determining conflicts lists at block 404 of FIG. 4. At block 424, FIG. 16 includes determining a distance between the individual region and at least one other region. And at block 426, FIG. 16 includes including at least one other region in (e.g., adding the at least one other region to) the conflicts list for the individual region based on the distance satisfying the minimum distance criterion.

Figure 17:
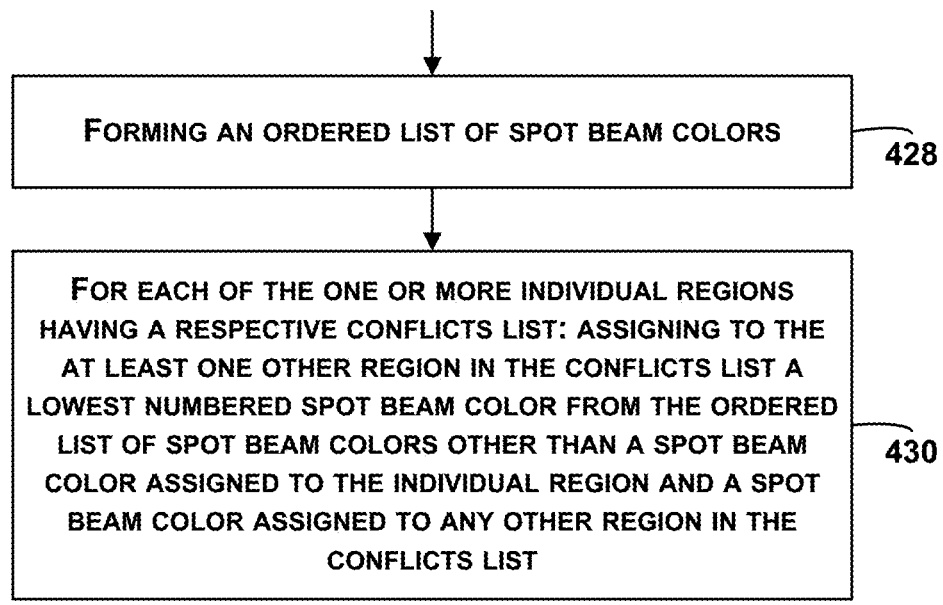
FIG. 17 shows a flow chart of another example method for use with the method shown in FIG. 4, according to an example implementation.

FIG. 17 shows a flow chart of another example method for use with the method shown in FIG. 4, according to an example implementation. Blocks 428 and 430 could be performed as part of the assigning spot beam colors at block 406 of FIG. 4. At block 428, FIG. 17 includes forming an ordered list of spot beam colors. And at block 430, FIG. 17 includes, for each of the one or more individual regions having a respective conflicts list: assigning to the at least one other region in the conflicts list a lowest numbered spot beam color from the ordered list of spot beam colors other than a spot beam color assigned to the individual region and a spot beam color assigned to any other region in the conflicts list.

Figure 18:
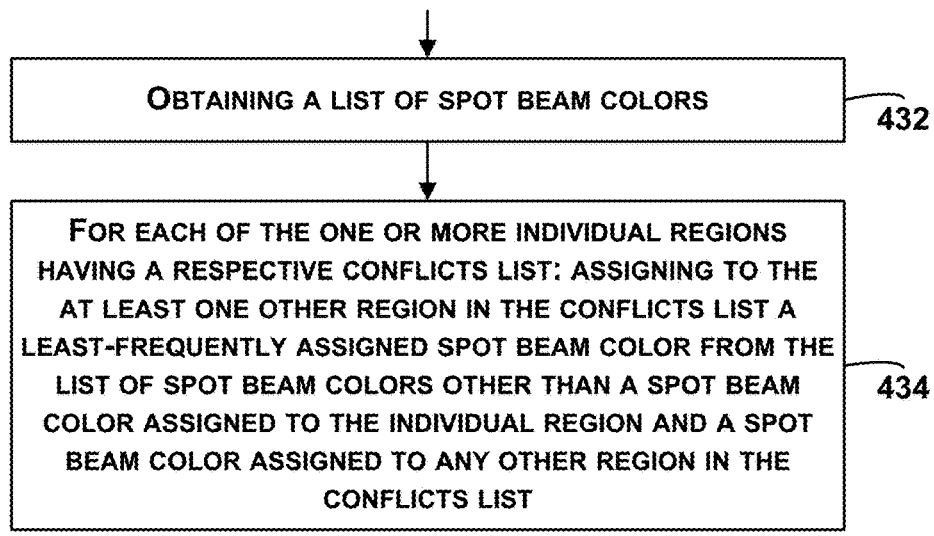
FIG. 18 shows a flow chart of another example method for use with the method shown in FIG. 4, according to an example implementation.

FIG. 18 shows a flow chart of another example method for use with the method shown in FIG. 4, according to an example implementation. Block 432 and block 434 could be performed as part of the assigning spot beam colors at block 406 of FIG. 4. At block 432, FIG. 18 includes obtaining a list of spot beam colors. And at block 434, FIG. 18 includes, for each of the one or more individual regions having a respective conflicts list: assigning to the at least one other region in the conflicts list a least-frequently assigned spot beam color from the list of spot beam colors other than a spot beam color assigned to the individual region and a spot beam color assigned to any other region in the conflicts list.

Figure 19:
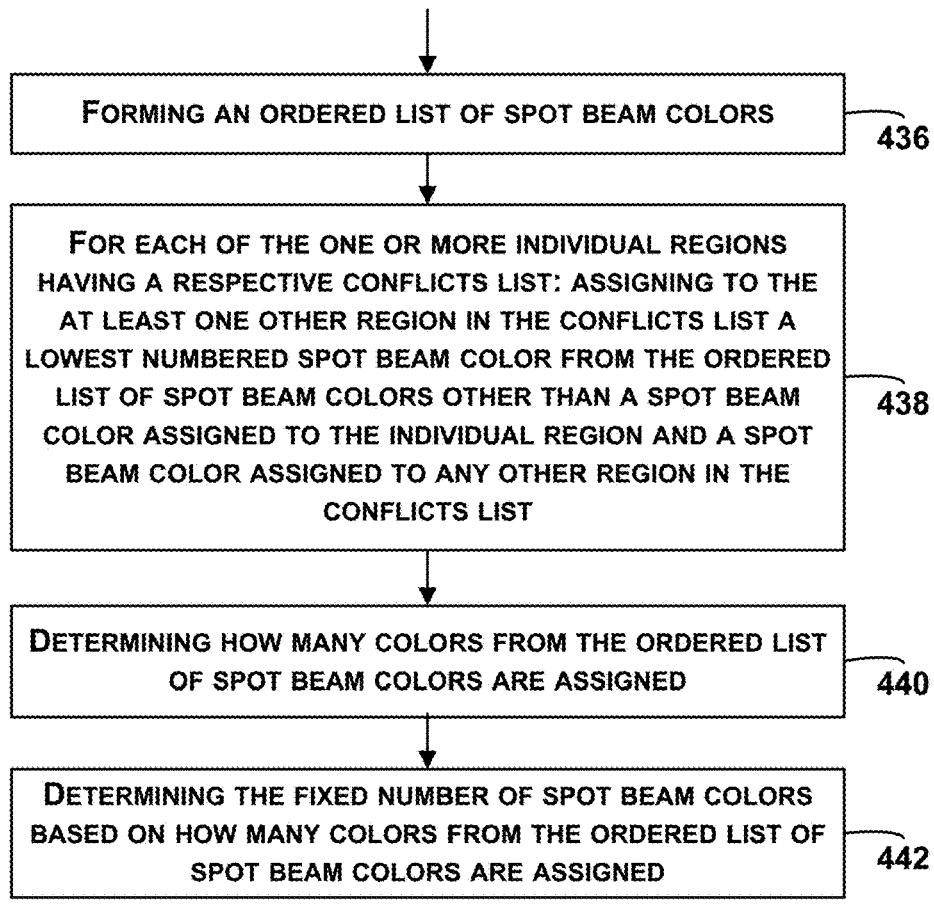
FIG. 19 shows a flow chart of another example method for use with the method shown in FIG. 4, according to an example implementation.

FIG. 19 shows a flow chart of another example method for use with the method shown in FIG. 4, according to an example implementation. Block 436, block 438, block 440, and block 442 could be performed as part of the obtaining a list of spot beam colors at block 432 of FIG. 18. At block 436, FIG. 19 includes forming an ordered list of spot beam colors. At block 438, FIG. 19 includes, for each of the one or more individual regions having a respective conflicts list: assigning to the at least one other region in the conflicts list a lowest numbered spot beam color from the ordered list of spot beam colors other than a spot beam color assigned to the individual region and a spot beam color assigned to any other region in the conflicts list. At block 440, FIG. 19 includes determining how many colors from the ordered list of spot beam colors are assigned. At block 442, FIG. 19 includes determining the fixed number of spot beam colors based on how many colors from the ordered list of spot beam colors are assigned.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. A method of coordinating reuse of spectrum in a communication system in which a communication node is configured to form multiple spot beams and communicate with devices that are located in multiple regions, the method comprising:
    obtaining a maximum interference constraint;
    determining, by at least one processor, respective conflicts lists for a plurality of individual regions of the multiple regions, wherein determining the respective conflicts lists comprises, for each individual region of the plurality of individual regions:
        determining a pairwise interaction between the individual region and at least one other region, and
        including the at least one other region in the conflicts list for the individual region based on the pairwise interaction violating a maximum interference constraint;
    assigning, by the at least one processor, spot beam colors to the multiple regions using the determined conflicts lists such that pairs of regions that violate the maximum interference constraint with respect to one another are assigned different spot beam colors; and
    causing the communication node to configure the multiple spot beams in accordance with the assigned spot beam colors,
    wherein, based on the determined pairwise interactions, a number of regions in a first conflicts list of a first individual region of the plurality of individual regions is different from a number of regions in a second conflicts list of a second individual region of the plurality of individual regions.

2. The method of claim 1, wherein the spot beam colors correspond to respective communication profiles defining respective orthogonal channels.

3. The method of claim 2, wherein assigning the spot beam colors to the multiple regions comprises assigning a first spot beam color corresponding to a first orthogonal channel to a first region of a pair of regions that violates the maximum interference constraint and assigning a second spot beam color corresponding to a second orthogonal channel that is orthogonal to the first orthogonal channel to a second region of the pair of regions, wherein the first orthogonal channel and the second orthogonal channel are orthogonal in frequency, polarization, code or time.

4. The method of claim 3, wherein regions of the multiple regions are adjacent, partially overlapping, fully overlapping, or disjoint.

5. The method of claim 1, wherein the communication node comprises a transmitter.

6. The method of claim 5, wherein the transmitter comprises a satellite transmitter.

7. The method of claim 1, wherein, for each individual region of the plurality of individual regions, determining the pairwise interaction between the individual region and the at least one other region comprises determining a value of a cost function that quantifies a level of isolation between a first spot beam corresponding to the individual region and a second spot beam corresponding to the at least one other region.

8. The method of claim 1, wherein the maximum interference constraint comprises a minimum distance criterion, and wherein the conflicts list for each individual region of the plurality of individual regions includes at least one other region of the multiple regions for which a distance between the individual region and the at least one other region is less than the minimum distance criterion.

9. The method of claim 8, wherein determining the respective conflicts lists for the plurality of individual regions of the multiple regions comprises, for each individual region of the plurality of individual regions:
    determining a distance between the individual region and at least one other region; and
    including the at least one other region in the conflicts list for the individual region based on the distance satisfying the minimum distance criterion.

10. The method of claim 1, wherein assigning the spot beam colors to the multiple regions using the determined conflicts lists comprises:
    forming an ordered list of spot beam colors; and
    for each of the plurality of individual regions having a respective conflicts list:
        assigning to the at least one other region in the conflicts list a lowest numbered spot beam color from the ordered list of spot beam colors other than a spot beam color assigned to the individual region and a spot beam color assigned to any other region in the conflicts list.

11. The method of claim 1, wherein assigning the spot beam colors to the multiple regions using the determined conflicts lists comprises:
    obtaining a list of spot beam colors having a fixed number of spot beam colors; and
    for each of the plurality of individual regions having a respective conflicts list:
        assigning to the at least one other region in the conflicts list a least-frequently assigned spot beam color from the list of spot beam colors other than a spot beam color assigned to the individual region and a spot beam color assigned to any other region in the conflicts list.

12. The method of claim 11, further comprising determining the fixed number of spot beam colors by:
  forming an ordered list of spot beam colors;
  for each of the plurality of individual regions having a respective conflicts list:
    assigning to the at least one other region in the conflicts list a lowest numbered spot beam color from the ordered list of spot beam colors other than a spot beam color assigned to the individual region and a spot beam color assigned to any other region in the conflicts list;
  determining how many colors from the ordered list of spot beam colors are assigned; and
  determining the fixed number of spot beam colors based on how many colors from the ordered list of spot beam colors are assigned.

13. A system comprising:
  a communication node configured to form multiple spot beams and communicate with devices that are located in multiple regions; and
  a controller comprising at least one processor, the controller arranged to:
    obtain a maximum interference constraint,
    determine respective conflicts lists for a plurality of individual regions of the multiple regions, wherein determining the respective conflicts lists comprises, for each individual region of the plurality of regions:
      (i) determining a pairwise interaction between the individual region and at least one other region and
      (ii) including the at least one other region in the conflicts list for the individual region based on the pairwise interaction violating a maximum interference constraint,
    assign spot beam colors to the multiple regions using the determined conflicts lists such that pairs of regions that violate the maximum interference constraint with respect to one another are assigned different spot beam colors, and
    cause the communication node to configure the multiple spot beams in accordance with the assigned spot beam colors,
  wherein, based on the determined pairwise interactions, a number of regions in a first conflicts list of a first individual region is different from a number of regions in a second conflicts list of a second individual region of the plurality of individual regions.

14. The system of claim 13, wherein the spot beam colors correspond to respective communication profiles defining respective orthogonal channels.

15. The system of claim 13, wherein the maximum interference constraint comprises a minimum distance criterion, and wherein the conflicts list for each individual region of the plurality of individual regions includes at least one other region of the multiple regions for which a distance between the individual region and the at least one other region is less than the minimum distance criterion.

16. A non-transitory computer-readable medium having stored therein instructions that, when executed by at least one processor, cause at least one processor to perform functions comprising:
  obtaining a maximum interference constraint for a communication system, wherein the communication system comprises a communication node that is configured to form multiple spot beams and communicate with devices that are located in multiple regions;
  determining respective conflicts lists for a plurality of individual regions of the multiple regions, wherein determining the respective conflicts list comprises, for each individual region of the plurality of individual regions:
    determining a pairwise interaction between the individual region and at least one other region, and
    including the at least one other region in the conflicts list for the individual region based on the pairwise interaction violating a maximum interference constraint;
  assigning spot beam colors to the multiple regions using the determined conflicts lists such that pairs of regions that violate the maximum interference constraint with respect to one another are assigned different spot beam colors; and
  causing the communication node to configure the multiple spot beams in accordance with the assigned spot beam colors,
  wherein, based on the determined pairwise interactions, a number of regions in a first conflicts list of a first individual region of the plurality of individual regions is different from a number of regions in a second conflicts list of a second individual region of the plurality of individual regions.

17. The non-transitory computer-readable medium of claim 16, wherein the spot beam colors correspond to respective communication profiles defining respective orthogonal channels.

* * * * *